(12) United States Patent
Takaura et al.

(10) Patent No.: US 8,162,485 B2
(45) Date of Patent: Apr. 24, 2012

(54) INTERMEDIATE IMAGE FORMATION OPTICAL SYSTEM, IMAGE FORMATION DEVICE, AND METHODS THEREOF

(75) Inventors: Atsushi Takaura, Tokyo (JP); Takanobu Osaka, Kanagawa (JP); Yasuyuki Takiguchi, Kanagawa (JP); Toshiaki Tokita, Kanagawa (JP); Kazuhiro Fujita, Tokyo (JP); Kazuya Miyagaki, Kanagawa (JP); Hiroyuki Sugimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1813 days.

(21) Appl. No.: 11/341,518

(22) Filed: Jan. 30, 2006

(65) Prior Publication Data
US 2006/0192903 A1 Aug. 31, 2006

(30) Foreign Application Priority Data

Jan. 31, 2005 (JP) .................................. 2005-024000

(51) Int. Cl.
G03B 21/14 (2006.01)
G03B 21/26 (2006.01)
H04N 5/74 (2006.01)
G09G 5/02 (2006.01)
G09G 3/18 (2006.01)
G09G 3/36 (2006.01)
G02F 1/1335 (2006.01)

(52) U.S. Cl. .............. 353/46; 353/30; 353/20; 348/767; 345/698; 345/50; 345/87; 349/5

(58) Field of Classification Search ................. 353/46, 353/20, 30; 348/767; 345/698, 50, 87; 349/5
See application file for complete search history.

(56) References Cited

U.S. PATENT DOCUMENTS 5,689,283 A * 11/1997 Shirochi ....................... 345/698
6,061,103 A * 5/2000 Okamura et al. ............. 348/767
(Continued)

FOREIGN PATENT DOCUMENTS
JP 3547015 4/2004
(Continued)

OTHER PUBLICATIONS

T. Tokita, et al. "FLC Resolution-Enhancing Device for Projection Displays"; Society for Information Display 2002 International Symposium Digest of Technical Papers, USA; May 2002, vol. XXXIII, No. I, pp. 638-641.

(Continued)

Primary Examiner — Georgia Epps
Assistant Examiner — Magda Cruz
(74) Attorney, Agent, or Firm — Oblon, Spivak, McClelland, Maier & Neustadt, L.L.P.

(57) ABSTRACT

An image projection device performing pixel shift in synchronization with sequential updating of image data is disclosed that is able to start and stop pixel shift operations within a period of updating the image frames while maintaining brightness of the image. The image projection device has an intermediate image formation optical system including a light valve able to update an image frame in a line-sequential manner, a pixel shift unit to shift the light path of a light beam from the light valve so as to shift a position of an image formed on the light valve, and an intermediate image formation unit arranged on the light path between the light valve and the pixel shift unit for forming an intermediate image of the image on the light valve at a position of the pixel shift unit.

14 Claims, 7 Drawing Sheets

U.S. PATENT DOCUMENTS

| | | | |
|---|---|---|---|
| 6,184,969 B1 * | 2/2001 | Fergason | 349/196 |
| 6,972,809 B2 * | 12/2005 | Nakanishi | 349/5 |
| 7,021,766 B2 * | 4/2006 | Uehara | 353/20 |
| 7,083,283 B2 * | 8/2006 | Uehara et al. | 353/20 |
| 2003/0132901 A1 * | 7/2003 | Shimada | 345/87 |

FOREIGN PATENT DOCUMENTS

| | | |
|---|---|---|
| JP | 2004-233950 | 8/2004 |
| JP | 3590138 | 8/2004 |
| JP | 2004-286935 | 10/2004 |
| JP | 2004-325494 | 11/2004 |

OTHER PUBLICATIONS

Japanese Office Action issued Feb. 1, 2011, in Patent Application No. 2005-024000.

Office Action issued Oct. 26, 2010, in Japan Patent Application No. 2005-024000.

* cited by examiner

INTERMEDIATE IMAGE FORMATION OPTICAL SYSTEM, IMAGE FORMATION DEVICE, AND METHODS THEREOF

BACKGROUND OF THE INVENTION

1. Field of the Invention

The present invention relates to an image projection device employing a pixel shift technique, and more particularly, relates to an optical system, an optical engine, an optical unit, and a projection unit of the image projection device.

2. Description of the Related Art

In a display device having a light valve element formed from plural pixels corresponding to different colors and arranged in a matrix manner, such as a projector or a head mounted display, the number of the pixels of the light valve element is increasing every year. Specifically, the light valve element may be a spatial optical modulation device, such as a liquid crystal light valve, or an LCoS (liquid crystal on Silicon), or a DMD (Digital Mirror Device). Along with the increase of the pixel number, the pixel size becomes smaller and smaller, and a pixel driving mechanism becomes fine and more complicated, causing an increases of the cost of the display device. In addition, when the pixel size becomes small, the ratio of effective pixel area to total area may decrease, and this may cause declination of light utilization. On the other hand, if the pixel number is increased without decreasing the pixel size, the size of a display element increases, the size of the optical system for the display element also increases, and this also causes an increase of the cost.

There exists a technique able to increase the effective pixel number without increasing the number of the pixels of the display element, which is known as "pixel shift technique", and is also referred to as a "wobbling technique". Specifically, the pixel shift technique can shift the pixels by a distance less than a pixel size on a display plane for a short time, so that it displays un-shifted pixels at normal positions and shifted pixels at the shifted positions on the display plane alternatively in a time-division manner, or displays the pixels shifted by different distances thus at different positions on the display plane in a time-division manner. Alternatively, it displays the un-shifted pixels and the shifted pixels at the same time with the un-shifted pixels and the shifted pixels being overlapped, or displays the shifted pixels at the same time with the shifted pixels being overlapped.

When displaying pixels with their positions being changed in the time-division manner, an image at a first position is viewed due to an after image effect on human eyesight, so that while the image at the first position is being viewed, an image at a second position is displayed, and it appears as if the number of pixels has been doubled.

Alternatively, plural display elements may be used, and pixel positions of the display elements may be slightly shifted relative to each other, allowing images of the display elements to be overlapped with each other. For example, the distance by which the pixels are shifted may be a half or a quarter of the pixel size.

The liquid crystal may be used for shifting the display positions of the pixels. Specifically, an optical axis of the light passing through the liquid crystal may be deflected (it is equivalent to "shifted" in a restricted meaning), and the deflected light is projected onto a projection plane to display an image corresponding to pixels of the display element.

Utilizing the birefringence characteristics of the liquid crystal, when the alignment angle of the liquid crystal is inclined relative to the optical axis, and the principal axis of the liquid crystal molecules is inclined relative to the optical axis, an extraordinary light ray component is subjected to the birefringence effect. In addition, the alignment angle of the liquid crystal molecules can be switched by the voltage applied on the liquid crystal layer. Therefore, by using an element including liquid crystal and a unit for applying a voltage on the liquid crystal, it is possible to switch a shift operation of the optical axis of the light passing through the liquid crystal. This pixel shift technique is a well-known technique.

When displaying images using the pixel shift technique, while the image at the first position is being viewed due to the after image effect, the pixel shift is performed and an image is displayed at the second position. This is quite effective to increase the resolution of the displayed image. In order to support display of moving pictures, generally, the frequency of changing the image frame is 60 Hz or higher; thus the pixel shift should be performed at a frequency higher than the frame display frequency. Therefore, it is necessary to change the alignment of the liquid crystal quickly. It is known that a ferroelectric liquid crystal has a fast response for voltage application. Further, it is known that a perpendicularly-aligned ferroelectric liquid crystal, the principal axis of the liquid crystal being orientated along the thickness direction of the liquid crystal layer, is a material preferable for high speed pixel shift operations.

A pixel shift element utilizing a liquid crystal alignment control technique using the birefringence characteristics of the perpendicularly-aligned ferroelectric liquid crystal and a voltage application unit is described in T. Tokita et al., "FLC Resolution-Enhancing Device for Projection Display", Society for Information Display 2002 International Symposium Digest of Technical Papers, USA, May 2002, Volume XXXIII, Number I, pp. 638-639 (referred to as "reference 1" hereinafter). In this pixel shift element, dielectric thin films are provided on two sides of a liquid crystal layer, and ITO thin film electrode layers are arranged outside the dielectric thin films, and the thus obtained structure is sandwiched by cover glass; the optical axis is defined to be a Z axis, a plane perpendicular to the optical axis is defined to be an X-Y plane; by switching ON/OFF voltage application, a tilt angle $\theta$, which is defined to be the angle between the principal axis of the liquid crystal and the optical axis, is switched along the $\pm Y$ direction in the YZ plane to shift an extraordinary light ray component of the light incident into the liquid crystal layer parallel to the $\pm Y$ direction according to the direction of the liquid crystal. By utilizing this light path shift technique, it is possible to shift the pixels in four directions, namely, in the $\pm X$ and $\pm Y$ directions.

Typical pixel shift operations include a step of displaying a pixel image at the first position, a step of shifting the pixel image to the second position, a step of displaying a pixel image at the second position, and a step of shifting the pixel image to the first position. Since each pixel is shifted and displayed at two positions, the number of displayed pixels is apparently doubled, or in other words, the number of image frames formed from the pixels is apparently doubled.

Further, the pixels can be shifted in both the horizontal direction and the vertical direction, thereby, apparently increasing the number of displayed pixels by four times. In this case, a mechanism able to shift the pixels in both the horizontal direction and the vertical direction is required. For this purpose, for example, a pixel shift element for shifting the alignment direction such as the perpendicularly-aligned ferroelectric liquid crystal in the $\pm X$ direction, and a pixel shift element for shifting the alignment direction of liquid crystal in the $\pm Y$ direction can be used together. In addition, if the horizontal direction and vertical direction of light valve elements are in agreement with the X direction and the Y direction, the pixels can be shifted in four directions, namely, in the ±X and ±Y directions. As a result, the number of displayed image frames is apparently increased by four times, and the amount of displayed image data is also increased by four times.

As another issue in image display using the pixel shift technique, if the pixel image being shifted is displayed, pixels appear to be connected to each other, and especially, when the image data before and after the pixel shift operation are quite different, because of connection of neighboring pixel images, pixel images are not well separately and this degrades the resolution of the displayed image.

For example, Japanese Laid-Open Patent Application No. 9-15548 (referred to as "reference 2" hereinafter) discloses a technique of preventing display of pixels being shifted. In the strict sense, this reference primarily focuses on a liquid crystal panel having pixels of a Delta arrangement, but prevention of displaying pixels being shifted is also mentioned.

As another issue in image display using the pixel shift technique, it is well known that an image formed from pixel images of a display element is read out from a frame memory frame by frame, and is updated. Generally, in the frame update of the display element, if pixel images of all pixels are updated at the same time, a very high operating speed is required. Due to this, the frame update is usually performed line-sequentially (line-sequential scheme). Each scanning line includes pixels arranged along a line.

Figure 11:
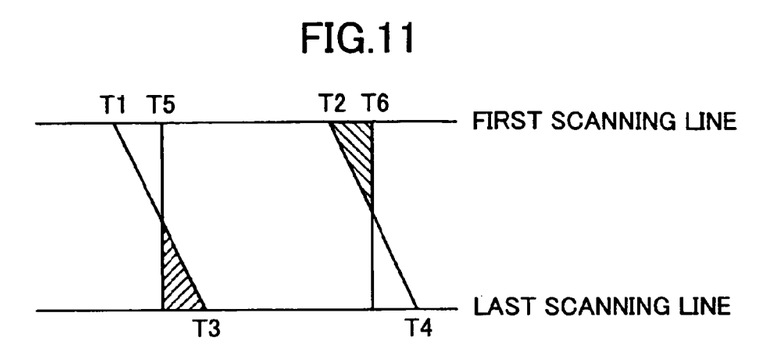
FIG. 11 is a diagram illustrating a timing of updating scanning lines and a timing of pixel shifting in the related art.

FIG. 11 is a diagram illustrating a timing of updating scanning lines and a timing of pixel shifting in the related art. In FIG. 11, a symbol "T" indicates time.

As shown in FIG. 11, in each frame, the pixel shift operations are performed twice or more. Here, a frame displayed after the pixel shift is referred to as a "sub-frame". The speed of updating the sub-frame should be sufficiently fast so that the time required for updating the sub-frame is shorter than the time required for displaying the sub-frame. Due to this, it is more difficult to update all pixels of one frame at the same time, and it is more preferably to update one frame line-sequentially.

However, another problem arises in the relation between the timing of pixel shifting and the timing of updating the sub-frame image. During the period of image frame updating, if the pixel shift is completed during the updating period while controlling the display element such that the display grade is at zero level, the image of the pixels being shifted is not displayed. Nevertheless, the timing of the image frame updating is delayed line-sequentially.

In FIG. 11, the abscissa represents a time axis, and the ordinate represents the direction of scanning line series; T1 represents the start time of updating the first scanning line, and T2 represents the end time of updating the first scanning line; T3 represents the start time of updating the last scanning line, and T4 represents the end time of updating the last scanning line; T5 represents the start time of the pixel shift, and T6 represents the end time of the pixel shift.

As shown in FIG. 11, time T3 is later than T1, and T4 is later than T2. This is the above-mentioned delay of the timing of the image frame updating.

Further, as shown in FIG. 11, in the period from the start time T3 of updating the last scanning line to the end time T2 of updating the first scanning line, the pixel shift is not finished, hence, in the hatched regions in FIG. 11, the pixel image being shifted ends up being displayed. In addition, in the hatched regions, the pixel shift is started while the previous frame is still being displayed, and similarly, the pixel image being shifted ends up being displayed.

In order that the pixel image being shifted is not displayed, it is necessary to set the time required for shifting the pixels (that is, T6−T5) to be shorter than the time required for updating the whole display element (that is, T4−T1). Alternatively, it is necessary to set an excessive standby time period so that even when frame updating is finished, the next sub frame is not displayed until the pixel shift is finished. However, in this case, time not used for displaying images increases, and light utilization declines; as a result, the displayed image is not bright enough. The above reference 2 does not mention these problems.

Japanese Laid-Open Patent Application No. 6-324320 (referred to as "reference 3" hereinafter) discloses a method of shifting the pixels in synchronization with vertical scanning of the scanning lines. As described in reference 3, in this method, employing the polarization effect, pixels are shifted and displayed only in a scanning line region where the frame updating has been performed. In the meantime, in the scanning line region in the state of the preceding frame, since the polarization effect does not occur, display positions of the pixels therein are not shifted. However, the above-described problems occurring in the line-sequential operations during the frame updating period are not mentioned.

Figure 12:
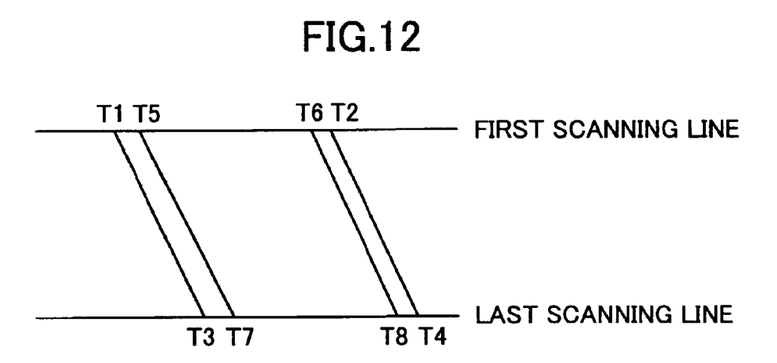
FIG. 12 is a diagram illustrating an ideal state in which pixel shift is performed in the period of updating the scanning lines while following delay of the updating timing in the related art.

FIG. 12 is a diagram illustrating an ideal state in which pixel shift is performed in the period of updating the scanning lines while following delay of the updating timing in the related art.

In FIG. 12, similar to FIG. 11, the abscissa represents the time axis, the ordinate represents the direction of scanning line series, and the symbol "T" represents time.

In the line-sequential frame updating operations, in order to maintain the brightness of the displayed image, as shown in FIG. 12, preferably, pixels are shifted line-sequentially in a region corresponding to pixels on scanning lines which have been updated.

In FIG. 12, T5 represents the start time of pixel shift of the first scanning line, and T6 represents the end time of the pixel shift of the first scanning line; T7 represents the start time of pixel shift of the last scanning line, and T8 represents the end time of the pixel shift of the last scanning line. In FIG. 12, the start time and the end time of the pixel shift are delayed line-sequentially. Thereby, it is possible to shorten or diminish the time difference between the time of image updating and the time of pixel shift; hence, it is possible to improve the brightness of the screen. In FIG. 12, if T1=T5, T2=T6, T3=T7, and T4=T8, the time difference becomes zero, and the time not used for display does not exist, allowing the most sufficient image display.

However, the sequential pixel shift in order of scanning lines cannot be performed by a pixel shift optical system in the related art.

Figure 13:
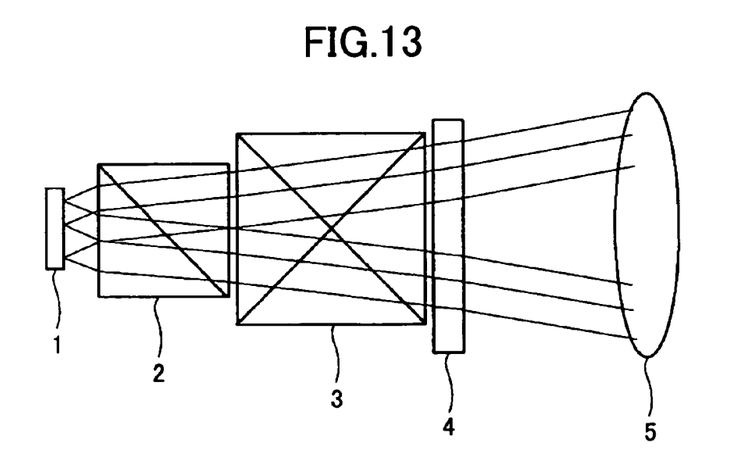
FIG. 13 is a schematic view of an optical system for pixel shift in the related art.

FIG. 13 is a schematic view of an optical system for pixel shift in the related art.

The optical system shown in FIG. 13 includes a light valve 1, a polarized-beam splitter 2, a color combination prism 3, a pixel shift element 4, and a magnification projection system 5. A light beam from the light valve 1 transmits through the polarized-beam splitter 2 and the color combination prism 3, and enters into the pixel shift element 4; the pixel shift element 4 shifts the path of the light beam, and the magnification projection system 5 projects the pixel-shifted image.

It should be noted that generally the light valves 1, the polarized-beam splitters 2, and illumination systems respectively corresponding to R, G, B three colors are provided in the above pixel shift optical system, but in FIG. 13, only one light valve 1 and one polarized-beam splitter 2 are illustrated for descriptive purposes.

In the above pixel shift optical system, as shown in FIG. 13, a light beam output from one pixel of the light valve 1 is spread and is incident on the pixel shift element 4. Thus, light beams from pixels of the light valve 1 on different scanning lines are partially overlapped with each other before entering into the pixel shift element 4, and it is difficult to spatially separate the light beams corresponding to different pixels. For this reason, it is difficult to perform the sequential pixel shift in order of scanning lines corresponding to the pixels of light valve 1.

Figure 14:
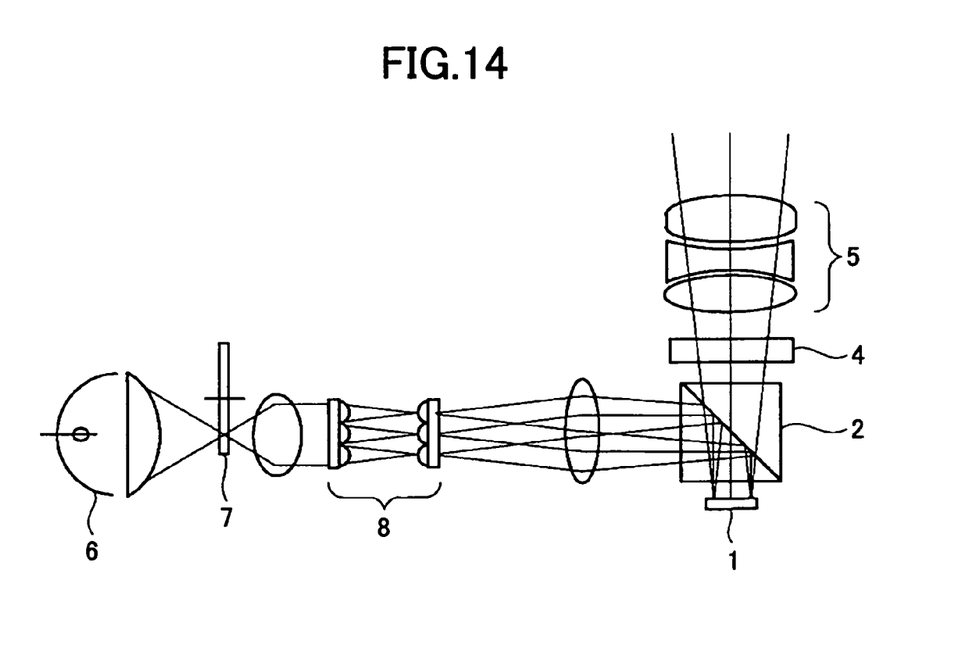
FIG. 14 is a schematic view of an image display device using a color wheel in the related art.

FIG. 14 is a schematic view of an image display device using a color wheel. In FIG. 14, the same reference numbers are assigned to the same elements as those illustrated in FIG. 13.

The image display device in FIG. 14 includes a lamp 6 acting as a light source, a color wheel 7, and a fly-eye lens array 8.

A light beam from the lamp 6 is converted into a Red (R), Green (G), or Blue (B) monochromatic light beam, is homogenized in light intensity and polarized to have a polarization plane along a specified direction by the fly-eye lens array 8, and incident into the light valve 1. In the light valve 1, the polarization direction of the light beam modulated according to image data is changed by 90 degrees, passes through a polarization reflection surface and enters into the pixel shift element 4. The subsequent operations are the same as those described with reference to FIG. 13.

As shown in FIG. 14, in an optical system using a light valve, and sequentially displaying R, G, B images with a color wheel, the same effect can be obtained by using the pixel shift element 4 as the optical system in FIG. 13, which uses optical systems respectively corresponding to R, G, B three colors (although illustrated only partially).

Similar to the optical system in FIG. 13, as it is difficult to spatially separate the light beams from different pixels corresponding to scanning lines of the light valve 1, it is difficult to perform the sequential pixel shift in order of scanning lines.

Namely, in the image display device employing the pixel shift technique, in the related art, when the perpendicularly-aligned ferroelectric liquid crystal is used as the pixel shift element, because the light valve and the pixel shift element are separated from each other, the timing of the pixel shift cannot be performed in synchronization with the timing of line-sequentially updating the image data, and this causes degradation of image quality. If the updating duration is lengthened in order to avoid this problem, the average image brightness becomes insufficient.

SUMMARY OF THE INVENTION

The present invention may solve one or more problems of the related art.

According to a first aspect of the present invention, there is provided an intermediate image formation optical system, comprising: a light valve able to update an image frame in a line-sequential manner; a pixel shift unit configured to shift a light path of a light beam from the light valve to shift a position of an image formed on the light valve; and an intermediate image formation unit arranged on a light path between the light valve and the pixel shift unit and configured to form an intermediate image of the image on the light valve at a position of the pixel shift unit.

As an embodiment, the image formed on the light valve is magnified to form the intermediate image.

As an embodiment, the pixel shift unit comprises: a liquid crystal layer; a transparent member holding the liquid crystal layer; and a voltage application unit that applies a voltage on the liquid crystal layer to change the direction of a liquid crystal axis so as to shift the light path of the light beam from the light valve.

As an embodiment, at ends of the scanning lines, the liquid crystal layer of the pixel shift unit extends up to a region outside a position of the voltage application unit.

As an embodiment, a light path separation unit is provided to separate a light path of illumination light to the light valve and a light path of light reflected from the light valve.

As an embodiment, the intermediate image formation unit has telecentricity in an image space between the intermediate image formation unit and the pixel shift unit.

As an embodiment, a linear light polarization unit is provided between the intermediate image formation unit and the pixel shift unit.

As an embodiment, the pixel shift unit includes a plurality of pixel shift areas independently drivable and arranged side by side in a plane perpendicular to an optical axis.

As an embodiment, the pixel shift areas shift the intermediate image in a line-sequential manner in synchronization with timing of updating the corresponding scanning line of the light valve.

As an embodiment, the pixel shift unit includes a plurality of pixel shift areas arranged along a direction perpendicular to the scanning lines of the light valve in a plane of the pixel shift unit, and the total number of the pixel shift areas is less than the number of the scanning lines.

As an embodiment, the number of the scanning lines included in different pixel shift areas is the same.

As an embodiment, a number of the scanning lines included in each of the pixel shift areas near a center portion of the scanning line series is greater than the number of the scanning lines included in each of the pixel shift areas in a periphery of pixel shift unit.

As an embodiment, the pixel shift unit includes the same number of pixel shift areas as the scanning lines in a plane perpendicular to an optical axis, said pixel shift areas being integrated into a line structure.

According to a second aspect of the present invention, there is provided an image display device, comprising: an intermediate image formation optical system, wherein the intermediate image formation optical system includes a light valve able to update an image frame in a line-sequential manner; a pixel shift unit configured to shift a light path of a light beam from the light valve to shift a position of an image formed on the light valve; and an intermediate image formation unit arranged on a light path between the light valve and the pixel shift unit and configured to form an intermediate image of the image on the light valve at a position of the pixel shift unit.

According to a third aspect of the present invention, there is provided a method of applying a voltage to an intermediate image formation optical system, said intermediate image formation optical system including a light valve able to update an image frame in a line-sequential manner; a pixel shift unit configured to shift a light path of a light beam from the light valve to shift a position of an image formed on the light valve; and an intermediate image formation unit arranged on a light path between the light valve and the pixel shift unit and configured to form an intermediate image of the image on the light valve at a position of the pixel shift unit, said method comprising a step of: applying voltages on a plurality of pixel shift areas of the pixel shift unit, independently.

As an embodiment, application of the voltage on one of the pixel shift areas is performed in a period of updating the image frame on the light valve corresponding to the one of the pixel shift areas.

According to an embodiment of the present invention, in an image projection device employing a pixel shift technique in connection with sequential updating of image data, it is possible to start and stop pixel shift operations within a period of updating the image frames while maintaining brightness of the images.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

Figure 1A:
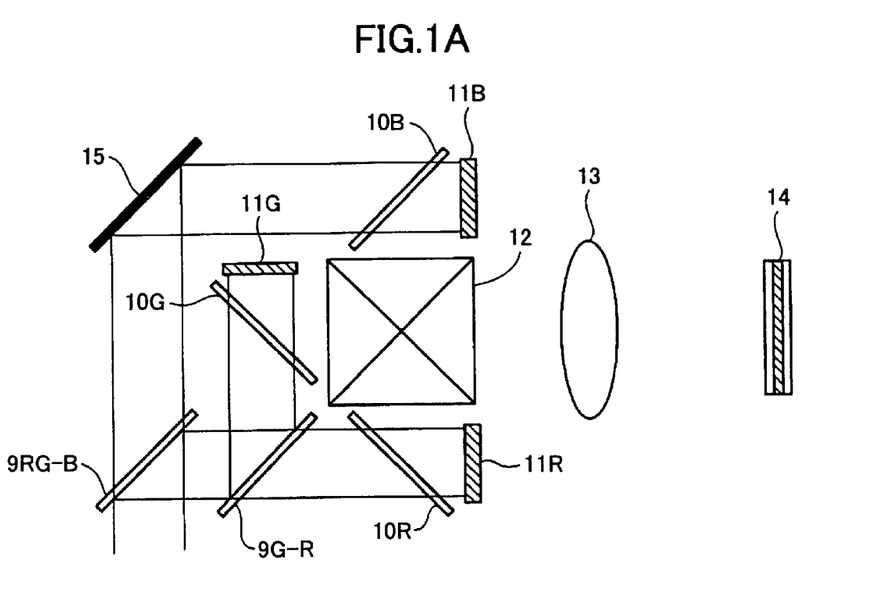
FIG. 1A is a schematic view of a portion of an image display device for separating an incident light beam into three monochromatic light beams, which includes an intermediate image formation optical system according to an embodiment of the present invention.
Figure 1B:
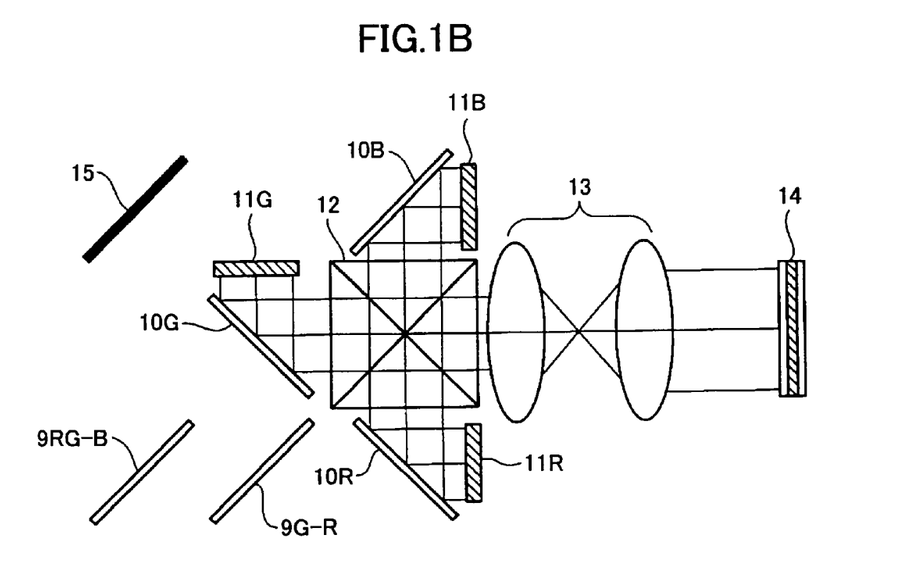
FIG. 1B is a schematic views of a portion of the image display device for combining the three monochromatic light beams according to image data, which includes an intermediate image formation optical system according to the embodiment of the present invention.

FIG. 1A and FIG. 1B are schematic views of portions of an image display device including an intermediate image formation optical system according to an embodiment of the present invention, where FIG. 1A illustrates a portion for separating an incident light beam into three monochromatic light beams, and FIG. 1B illustrates a portion for combining the three monochromatic light beams according to image data.

The image display device shown in FIG. 1A and FIG. 1B includes dichroic mirrors 9RG-B, 9G-R, polarized-beam splitters (abbreviated as "PBS") 10R, 10G, 10B, reflective light valves 11R, 11G, 11B, a color combination prism 12, an intermediate image formation unit 13, a pixel shift element 14, and a mirror 15. In FIG. 1A and FIG. 1B, symbols "R", "G", "B" indicates Red, Green, and Blue colors, respectively.

As shown in FIG. 1A, illumination light is incident upward from the bottom; the dichroic mirror 9RG-B (the symbol "RG-B" means that Red light and Green light are reflected, and Blue light transmits through the dichroic mirror) reflects Red and Green light beams to the right side, and allows the Blue light to transmit through the dichroic mirror 9RG-B and propagate upward; then the mirror 15 reflects the Blue light beam to the right side.

The reflected Red and Green light beams are incident on the dichroic mirror 9G-R (the symbol "G-R" means that the Green light is reflected, but the Red light transmits through the dichroic mirror) reflects the Green light beam upward, and allows the Red light to transmit through the dichroic mirror 9G-R to the right side.

In this way, the incident light beam is separated into three light beams of different colors propagating along different light paths.

The three light beams of different colors propagate along their corresponding light paths and transmit through the polarized-beam splitters 10R, 10G, 10B (below, the symbols "R", "G", "B" are omitted where appropriate with the components for different colors being represented by the same reference number), and then are incident onto the reflective light valves 11R, 11G, 11B, respectively. Images formed on the reflective light valves 11R, 11G, 11B are line-sequentially updated.

As shown in FIG. 1B, the illumination light incident on the reflective light valves 11 are reflected by the reflective light valves 11. In FIG. 1B, the reflected light is shown to be principal rays from three points, that is, from the center of an image and from two points in the periphery of the image. The reflected light, whose polarization plane is changed, is returned to the polarized-beam splitters 10.

The light beams from the polarized-beam splitters 10 are incident into the color combination prism 12. The reflected light of different colors from the reflective light valves 11R, 11G, 11B are combined in the color combination prism 12, and are incident onto the pixel shift element 14 via the intermediate image formation unit 13. Since the intermediate image formation unit 13 has telecentricity in the image space from the reflective light valves 11 to the intermediate image formation unit 13, the principal rays shown in FIG. 1B are parallel to the optical axis. Similarly, since the intermediate image formation unit 13 has telecentricity in the image space from the intermediate image formation unit 13 to the pixel shift element 14, the principal rays shown in FIG. 1B are parallel to the optical axis. In addition, the reflective light valves 11 and the pixel shift element 14 are arranged to be optically conjugate with each other relative to the intermediate image formation unit 13.

In the hatched region of the pixel shift element 14, action of light path shift occurs. The pixel shift element 14 is configured and arranged such that when the reflection plane of the reflective light valves 11 serves as the object plane of the intermediate image formation unit 13, the image plane is transmitted to the hatched region of the pixel shift element 14. An intermediate image of a pixel in any scanning line on the reflective light valves 11 is formed in the hatched region of the pixel shift element 14. Concerning the sizes of the reflective light valves 11 and the pixel shift element 14, from the point of view of difficulty of fabrication, usually, the pixel shift element 14 is made larger than the reflective light valves 11. Thus, usually, the intermediate image formed by the intermediate image formation unit 13 is magnified. Here, the configuration from the light source to the position of the intermediate image is referred to as an "intermediate image formation optical system".

The pixel shift element 14 includes a perpendicularly-aligned ferroelectric liquid crystal layer and glass plates holding the liquid crystal layer, and between the liquid crystal layer and each of the glass plates, there is provided an ITO transparent electrode layer, allowing a voltage to be applied on the liquid crystal layer. The principal axis of the liquid crystal layer is inclined relative to the optical axis Z in the YZ plane (see FIG. 2), and the angle between the principal axis of the liquid crystal layer and the optical axis can be switched to be positive or negative in response to ON/OFF of the voltage. At the same time, the light beams passing through the liquid crystal layer receive the light path shift action, and thus, it is possible to realize pixel shift.

In FIG. 1B, the intermediate image formation unit 13 is provided on the path between the polarized-beam splitters 10 and the pixel shift element 14. Because the intermediate image formation unit 13 does not imposes influences on the polarization state of the light beam incident into the polarized-beam splitters 10, the characteristics of the polarized light beam do not degrade.

According to the optical configuration as shown in FIG. 1B, it is possible to spatially separate an intermediate image of a pixel in a N-th scanning line on the reflective light valves 11 and an intermediate image of a pixel in a N+1-th scanning line on the reflective light valves 11; thus, in the regions of the intermediate images spatially separated, it is possible to perform pixel shift with the region being selected. Further, the light beam condensed in the intermediate image plane is incident onto a not-illustrated magnification projection system 15, and the magnification projection system 15 magnifies and projects the incident light onto a not-illustrated final image plane 16 to form an image again.

Figure 2:
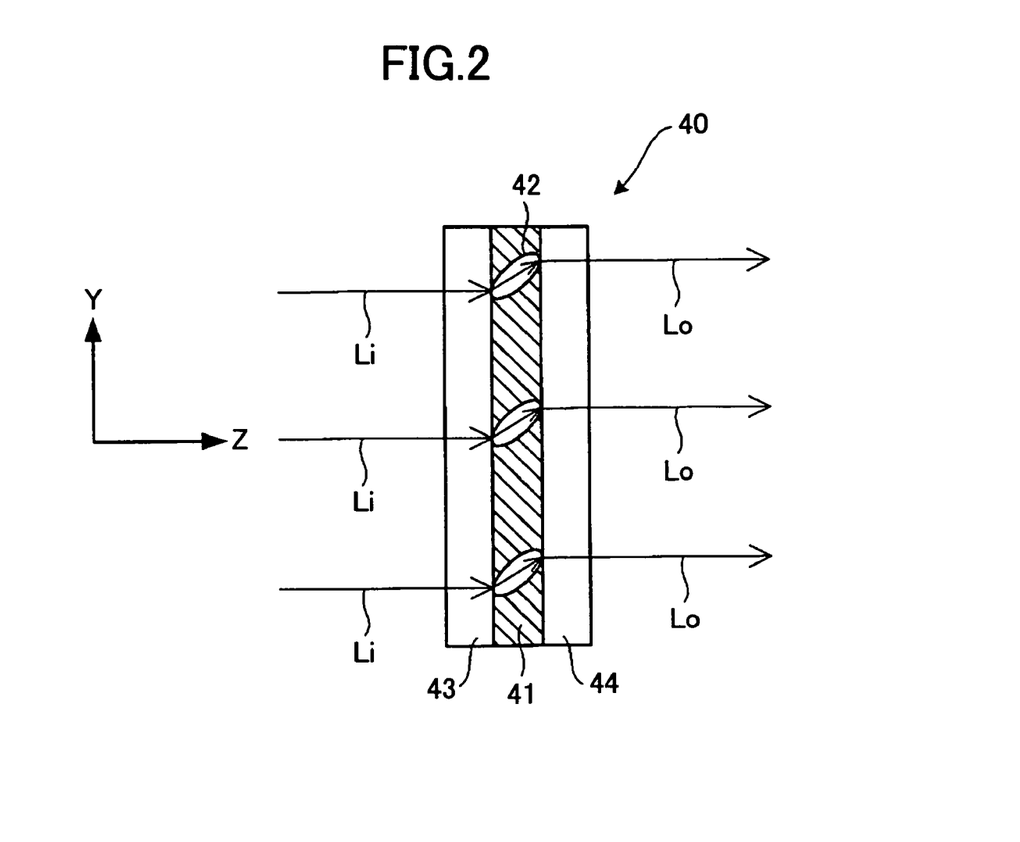
FIG. 2 is a schematic view illustrating functions of the liquid crystal used in the pixel shift element 14.

FIG. 2 is a schematic view illustrating functions of the liquid crystal used in the pixel shift element 14.

FIG. 2 shows a liquid crystal element 40 serving as the pixel shift element 14, which includes a liquid crystal layer 41 having liquid crystal molecules 42, and transparent substrates 43 and 44 formed from light-transparent materials. In FIG. 2, "Li" and "Lo" indicate incident principal rays and emission principal rays, respectively.

In FIG. 2, the pixel shift element 14 is configured so that extraordinary rays among the incident principal rays Li perpendicularly incident to the liquid crystal layer 41 are perpendicularly emitted out relative to the liquid crystal layer 41 as the emission principal rays Lo, thereby, ensuring the light path shift to be constant relative to all object heights on a plane of a spatial modulation element. For this purpose, when using the pixel shift element 14, it is important to ensure that the principal rays Li incident to the pixel shift element 14 be perpendicularly incident to the liquid crystal layer 41. It should be noted that the light paths of the ordinary rays are not shifted.

In FIG. 2, when voltage application on the liquid crystal layer 41 is turned OFF, the orientation of the principal axis of the liquid crystal molecules 42 is reversed, and the emission position of the emission principal rays Lo is shifted downward. In FIG. 2, opposed electrodes are provided between the liquid crystal layer 41 and the transparent substrate 43, and the liquid crystal layer 41 and the transparent substrate 44, and this allows a voltage to be applied on the liquid crystal layer 41.

For example, the electrodes between the liquid crystal layer 41 and the transparent substrate 43, and the liquid crystal layer 41 and the transparent substrate 44 may be ITO (Indium Tin Oxide) transparent electrodes, and the liquid crystal may be any liquid crystals able to form a chiral smectic C phase having homeotropic alignment.

Figure 3:
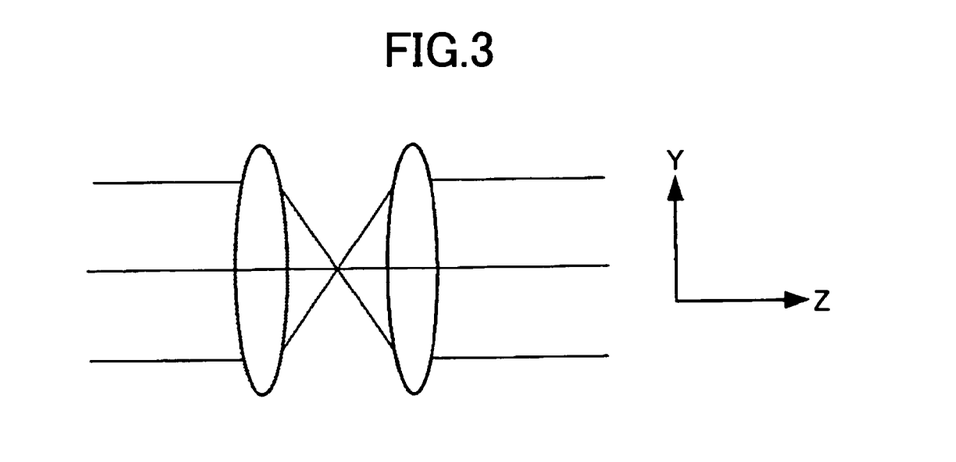
FIG. 3 is a diagram illustrating functions of the intermediate image formation unit 13.

FIG. 3 is a diagram illustrating functions of the intermediate image formation unit 13.

FIG. 3 shows three typical principal rays. These principal rays are incident parallel to the optical axis of the intermediate image formation unit 13, and are perpendicularly incident to the X-Y plane of the pixel shift element 14 after being transmitted out from the intermediate image formation unit 13. Due to this, the intermediate image formation unit 13 is configured to have telecentricity in the image space, thus ensuring that any pixels of the intermediate images of the light valve formed at the position of the pixel shift element 14 will receive constant light path shifting.

When the opening of the intermediate image formation unit 13 is larger than the effective size of the reflective light valves 11, even for usual optical elements for an inverted real image optical system, because the light beams perpendicularly incident to the surface of the pixel shift element 14 are not separated from the principal rays so much, practical use is possible.

Figure 4:
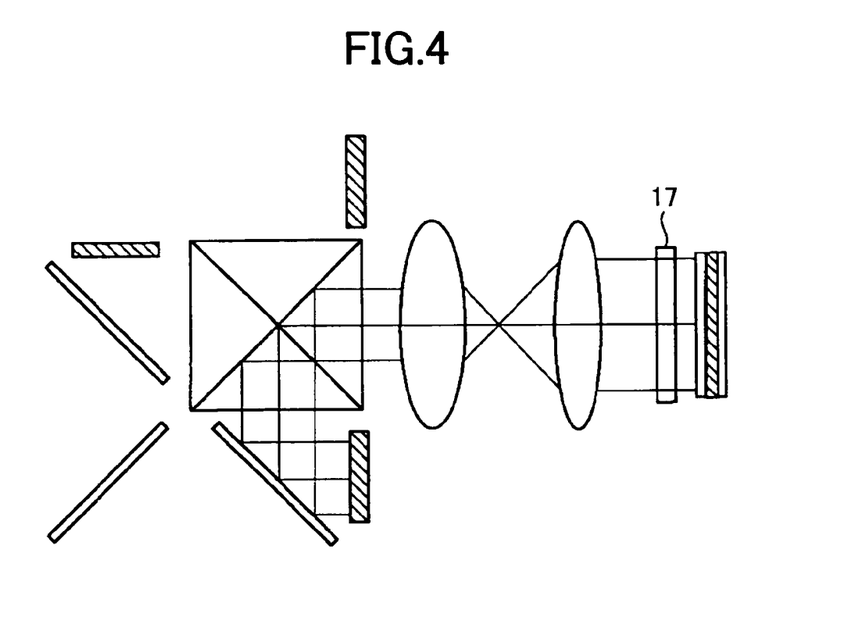
FIG. 4 is a schematic view of a portion of the image display device for controlling the polarization of the light beam incident to the pixel shift element 14.

FIG. 4 is a schematic view of portions of an image display device for controlling the polarization of the light beam incident to the pixel shift element 14.

Figure 5:
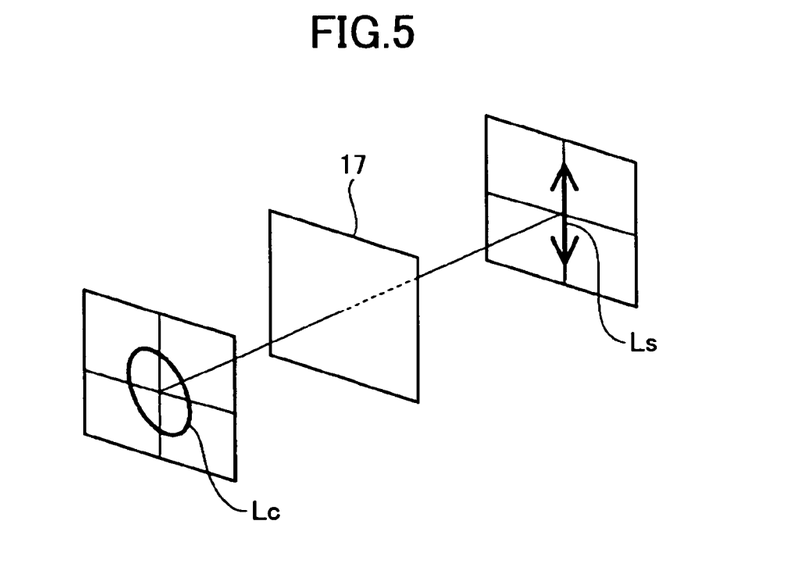
FIG. 5 is a schematic view illustrating control of the polarization of the light beam incident to the pixel shift element 14.

In FIG. 4, a linear polarizer 17 is provided; in FIG. 5 "Lc" represents an elliptically-polarized light beam, and "Ls" represents a linearly-polarized light beam.

As already described with reference to FIG. 2, it is preferable that a light beam be linearly-polarized in the Y direction within the Y-Z plane, where the liquid molecules move in response to switching of the voltage application. Therefore, it is preferable that the reflected light beam from the reflective light valves 11 be a linearly-polarized light beam in the Y direction, but when the linearly-polarized light beam passes through the intermediate image formation unit 13, because of depolarization caused by refraction action of the lenses, the linearly-polarized light beam becomes an elliptically-polarized light beam. Hence, as shown in FIG. 4, a linear polarizer 17 is provided between the intermediate image formation unit 13 and the pixel shift element 14 to allow the light beam linearly-polarized in the Y direction only to pass through and to enter into the pixel shift element 14.

FIG. 5 is a schematic view illustrating control of the polarization of the light beam incident to the pixel shift element 14.

As shown in FIG. 5, the elliptically-polarized light beam Lc produced by depolarization passes through the linear polarizer 17, and the linear polarizer 17 allows a linearly-polarized light beam to transmit through, generating a linearly-polarized light beam Ls, and this linearly-polarized light beam Ls is incident to the pixel shift element 14.

Because of the intermediate image formation unit 13, it is possible to change the sizes of the produced images of the light valves. For example, a small light valve may be 12.7 mm in diagonal, and a large light valve may be 50.8 mm in diagonal.

If the light valve image is larger than the light valve, when performing the pixel shift line-sequentially by the pixel shift element 14, the structure of the pixel shift element 14 can be compact. However, when the area where the pixel shift to be performed is divided into plural regions line-sequentially, and the pixel shift is performed in each of the regions, if the area where the pixel shift to be performed is small, the operational stability of the liquid crystal may be degraded.

Therefore, in this embodiment, the size of the light valve image is larger than the light valve, that is, the light valve image is magnified. As a result, it is possible to improve the operational stability of the liquid crystal layer whose driving region is divided into parts.

It is not always necessary to divide the liquid crystal layer. It is sufficient as long as the voltage may be applied independently on several regions of the liquid crystal layer.

For example, the pixel shift driving region of the pixel shift element 14 may be divided into plural pixel shift areas (also referred to as "divisional pixel shift driving region", or just "divisional region") along the direction perpendicular to the scanning lines of the light valve. Because the total number of the divisional regions is less than the number of the scanning lines, the driving operation of the liquid crystal layer is stable. If the number of the divisional regions is too large, a voltage is also applied on regions where pixel shift is not performed, and this results in occurrence of pixel shift in neighboring regions. Even when the number of the divisional regions is small, the voltage may be applied on portions of the neighboring regions where pixel shift is not performed, too, but this influences only the neighboring portions, not the whole region; hence, pixel shift can hardly occur in the neighboring regions.

In addition to the total number of the pixel shift driving regions of the pixel shift element 14 being equal to or approximately equal to the number of the scanning lines of the light valve, the driving region for driving the pixel shift operation at the same timing is not one part of the divided driving region, but plural neighboring driving regions. That is, plural neighboring driving regions operate together to serve as one driving region for driving the pixel shift operation. This also effectively reduces interference imposed on regions where pixel shift is not to be performed. If the total number of the pixel shift driving regions of the pixel shift element 14 is large, even when the number of the scanning lines of the light valve changes, it is still possible to use the same pixel shift element 14 to perform the pixel shift line-sequentially. Namely, by varying the number of the scanning lines included in divisional regions where the pixel shift is to be driven at the same timing, it is sufficient to just drive the regions by applying voltages. For example, a voltage driving circuit may be provided beforehand to apply voltages on the many small divisional driving regions, independently.

As another method, in the pixel shift element 14, the number of the scanning lines included in divisional regions where the pixel shift is to be driven at the same timing may be equal. In this case, in the liquid crystal layer corresponding to the divisional pixel shift driving regions, the electrical field distribution generated along with the voltage application becomes the same in different divisional regions. Thus it is possible to improve uniformity of the pixel shift operation between different divisional regions.

Alternatively, the number of the scanning lines included in each of the divisional pixel shift driving regions near the center of the scanning line series is greater than the number of the scanning lines included in each of the divisional regions in the periphery of the pixel shift region. In this case, it is possible to improve stability of the pixel shift operation near the center portion of the screen.

For example, in applications of television sets, sight lines of viewers are likely to be focused on the center portion of the screen; hence, with the above method, it is possible to obtain good image quality in this case.

In addition, for example, in applications of projectors, the brightness of the center portion of the screen is likely to be lower than the brightness of the peripheral portion. Methods of making the brightness of the screen uniform have been discussed, but this can be achieved by simply increasing the number of the scanning lines included in the pixel shift driving regions near the center, and reducing the number of the scanning lines included in the peripheral pixel shift driving regions; thereby, the brightness of the image portion near the center of the screen decreases accordingly, and it is possible to maintain good balance of the brightness on the whole screen.

In the pixel shift element 14, if the liquid crystal layer does not exist outside the positions of the opposed electrodes at the ends of the scanning lines, the electrical field distribution in the liquid crystal layer generated when the voltage is applied becomes asymmetric comparing to the electrical field distribution in the center portion, and thus, the liquid crystal driving state is not the same compared to the electrical field distribution in the center portion. Furthermore, the pixel shift operation is not the same, either, compared to that in the center portion.

To avoid this problem, in this embodiment, for example, the liquid crystal layer is provided also in regions outside the positions of the electrodes at ends of the scanning lines, and this makes the electrical field distribution uniform.

Alternatively, the pixel shift element 14 may be formed such that the effective region of the pixel shift element 14, that is, the light valve image, is slightly larger than the pixel shift region, and this also solves the above problems occurring at the ends.

The image frame of the light valve is updated line-sequentially. In addition, the intermediate image plane is shifted line-sequentially in synchronization with the timing of the image frame updating in units of multiple neighboring scanning lines.

Figure 6:
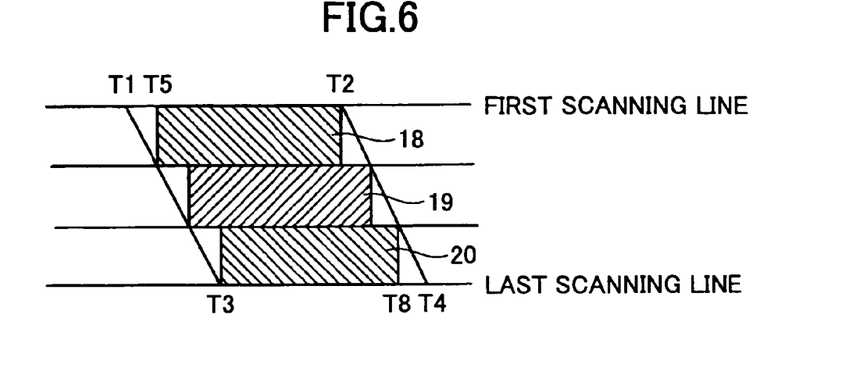
FIG. 6 is a diagram illustrating a method of pixel shifting in units of scanning line groups with the scanning lines of the image being divided into plural groups.

FIG. 6 is a diagram illustrating a method of pixel shifting in units of scanning line groups with the scanning lines of the image being divided into plural groups.

Shown in FIG. 6 are a first scanning line group 18, a second scanning line group 19, and a third scanning line group 20.

The first scanning line group 18 includes scanning lines 1 to M (M is an integer, indicating the scanning line number). In the course of frame updating of the first scanning line group 18, in the period from the start time T5 of updating the scanning line M to the end time T2 of updating the scanning line 1, pixel shift is performed on the intermediate images of the pixels in the scanning lines 1 to M.

Next, the second scanning line group 19 includes scanning lines M+1 to N (N is an integer, indicating the scanning line number). In the course of frame updating of the second scanning line group 19, in the period from the start time of updating the scanning line N to the end time of updating the scanning line M+1, pixel shift is performed on the intermediate images of the pixels in the scanning lines M+1 to N.

Following the same procedure, the pixel shift is performed until the pixels of the last scanning line group. Although this is not a line-sequential scheme in the strict sense, the pixel shift is performed line-sequentially in units of the scanning line groups.

In addition, with the total number of the pixel shift areas being less than the number of the scanning lines, the time period not used for displaying an image becomes short compared to the related art, and the image becomes bright compared to the related art.

In the above description with respect to FIG. 6, the pixel shift region is divided into three scanning line groups, and the division is performed in synchronization with frame updating of the light valve, but the number of the scanning line groups may be greater than three. For example, as described below, the widths of the divisional regions in the Y direction may be reduced so that only one scanning line is included.

Figure 7:
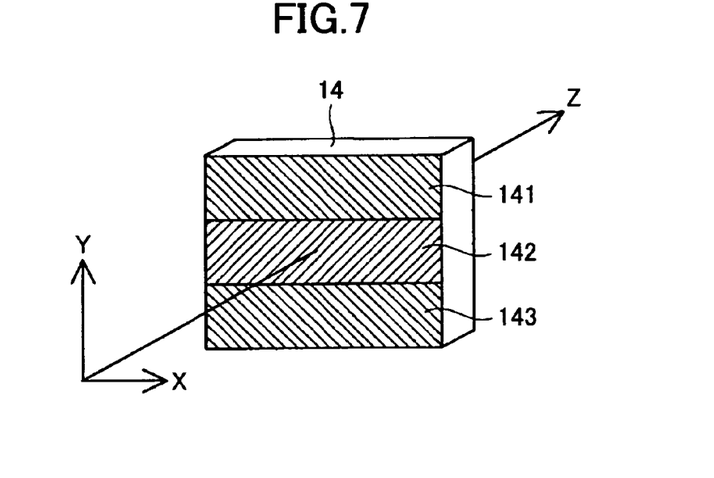
FIG. 7 is a schematic view exemplifying a configuration of the pixel shift element 14 for executing the pixel shift operation shown in FIG. 6.

FIG. 7 is a schematic view exemplifying a configuration of the pixel shift element 14 for executing the pixel shift operation shown in FIG. 6.

Shown in FIG. 7 are an intermediate image region 141 corresponding to the first scanning line group 18, an intermediate image region 142 corresponding to the second scanning line group 19, and an intermediate image region 143 corresponding to the third scanning line group 20.

In FIG. 7, the intermediate image region 141, the intermediate image region 142, and the intermediate image region 143 of an incidence plane of the pixel shift element 14 correspond to the first scanning line group 18, the second scanning line group 19, and the third scanning line group 20, respectively, shown in FIG. 6. In the pixel shift element 14, a number of the pixel shift areas corresponding to the intermediate image region 141, the intermediate image region 142, and the intermediate image region 143 form an integrated line structure in a plane perpendicular to the optical axis, and these pixel shift areas are driven independently for pixel shifting at the timing in synchronization with the timing of line-sequentially updating the image frame.

Figure 8:
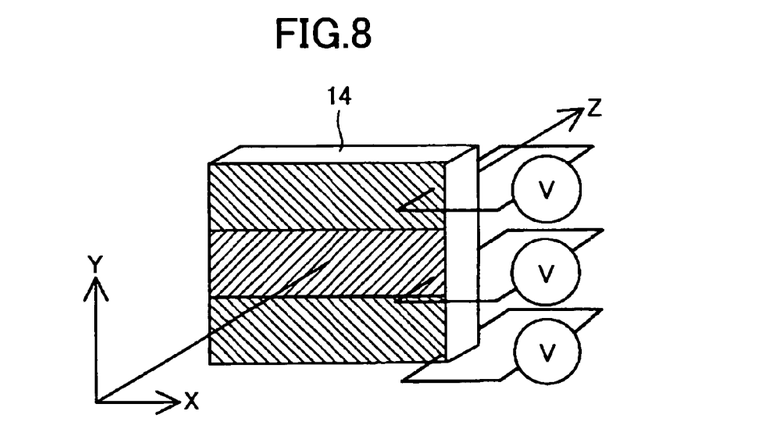
FIG. 8 illustrates operations of voltage application on the pixel shift element 14.

FIG. 8 illustrates operations of applying a voltage on the pixel shift element 14.

In the pixel shift element 14 as shown in FIG. 7, which is divided into pixel shift areas (divisional regions) side by side, for the liquid crystal layer corresponding to the pixel shift areas, one voltage application unit is provided to apply a voltage on the electrode-pair in each pixel shift area, so as to apply a voltage to the pixel shift area independently. The electrode-pairs of different pixel shift areas are isolated from each other.

In FIG. 8, by increasing the number of the divisional regions up to the number of the scanning lines, and applying voltages to the pixel shift areas independently, it is possible to perform pixel shift in the pixel shift areas independently, and realize pixel shift in units of scanning lines. It should be noted that also in this case, electrodes of neighboring regions are separated from each other.

As for the timing of voltage application of the voltage application units, a voltage is applied on the first scanning line group 18 in the period from the start time of updating the last scanning line (M) of the first scanning line group 18 to the end time of updating the first scanning line group 18. A voltage is applied on the second scanning line group 19 in the period from the start time of updating the last scanning line (N) of the second scanning line group 19 to the end time of updating the second scanning line group 19. A voltage is applied on the third scanning line group 20 in the period from the start time of updating the last scanning line (N) of the third scanning line group 20 to the end time of updating the third scanning line group 20. In addition, the timing of voltage application on the second scanning line group 19 is late compared to the timing of voltage application on the first scanning line group 18, and the timing of voltage application on the third scanning line group 20 is late compared to the timing of voltage application on the second scanning line group 19.

Generally, when performing pixel shift in units of scanning lines, a voltage is applied on the N-th scanning line group in the period from the start time of updating the N-th scanning line of the N-th scanning line group to the end time of updating the first scanning line of the N-th scanning line group, and the timing of voltage application on the N+1-th scanning line group is late compared to the timing of voltage application on the N-th scanning line group.

If the normal of a screen of the light valve is defined to be along the Z-axis, a direction perpendicular to the scanning lines is defined to be along the Y-axis. If further specifying the normal of the liquid crystal plane to be along the Z-axis, and the liquid crystal plane (pixel shift plane) to be in the X-Y plane, in order to perform the pixel shift line-sequentially in the −Y direction, the light valve and the pixel shift unit 14 are arranged as specified. Due to this, the direction of updating the frame line-sequentially on the light valve is in agreement with the direction of pixel shift line-sequentially on the pixel shift unit.

Figure 9:
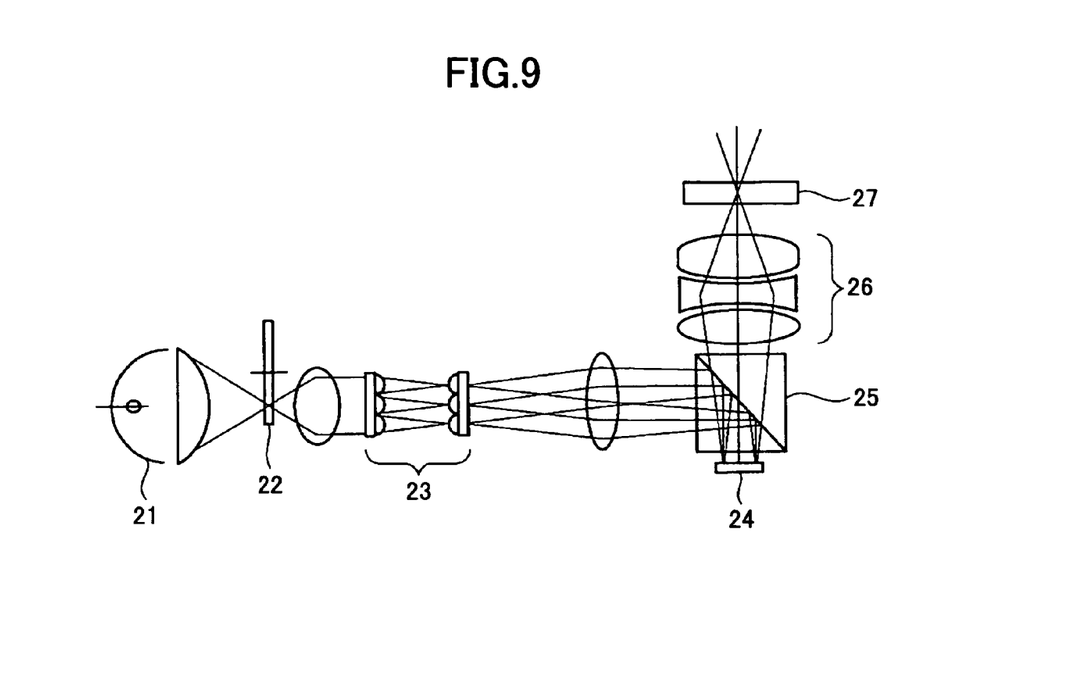
FIG. 9 is a schematic view of an image display device having a color wheel according to the embodiment of the present invention.

FIG. 9 is a schematic view of an image display device having a color wheel according to the embodiment of the present invention.

The image display device in FIG. 9 includes an illumination light source 21, a color wheel 22, a fly-eye lens array 23 for homogenizing the illuminance distribution, a light valve 24, a polarized-beam splitter (PBS) 25, an intermediate image formation unit 26, and a pixel shift element 27.

As shown in FIG. 9, with only one reflective light valve 24, white light from the illumination light source 21 is converted into a Red (R), Green (G), or Blue (B) monochromatic light beams, and is incident to the light valve 24 time-sequentially. In FIG. 9, the intermediate image formation unit 26 is provided on the path between the polarized-beam splitter 25 and the pixel shift element 27. An intermediate image is generated by the pixel shift element 27, as described in the example corresponding to FIG. 1A and FIG. 1B.

Figure 10:
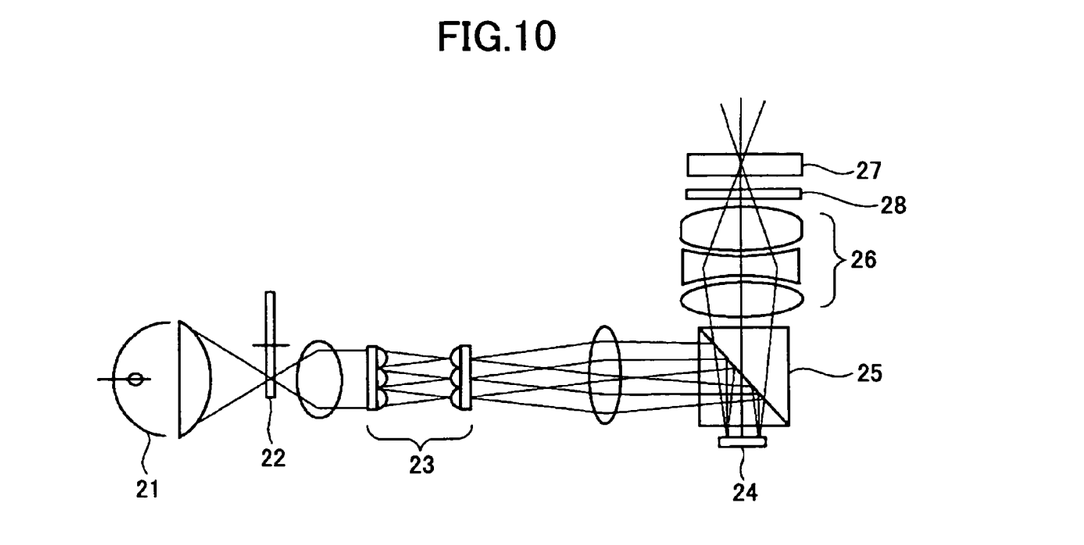
FIG. 10 is a schematic view of the image display device for controlling the polarization state of the light beam incident to the pixel shift element 27.

FIG. 10 is a schematic view of the image display device for controlling the polarization state of the light beam incident to the pixel shift element 27.

In FIG. 10, a linear polarizer 28 is provided between the intermediate image formation unit 26 and the pixel shift element 27 to ensure a linearly-polarized light beam to be incident to the pixel shift element 27. The same effect as those shown with reference to FIG. 4 is obtainable.

In addition to the example in FIG. 10, when the light valve is a DMD, or transmission-type liquid crystal light valve, by arranging the intermediate image formation unit 26 appropriately, and by further combining the linear polarizer 28, the same effect as above is obtainable.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Applications No. 2005-024000 filed on Jan. 31, 2005, the entire contents of which are hereby incorporated by reference.

What is claimed is:

1. An intermediate image formation optical system, comprising:
    a light valve configured to update an image frame in a line-sequential manner;
    a pixel shift unit configured to shift a light path of a light beam from the light valve so as to shift a position of an image formed on the light valve; and
    an intermediate image formation unit arranged on the light path between the light valve and the pixel shift unit and configured to form an intermediate image of the image on the light valve at a position of the pixel shift unit, wherein
    the pixel shift unit includes a plurality of pixel shift areas arranged along a direction perpendicular to scanning lines of the light valve in a plane of the pixel shift unit, and
    a number of the scanning lines included in each of the pixel shift areas near a center portion of the scanning line series is greater than a number of the scanning lines included in each of the pixel shift areas in a periphery of the pixel shift unit.

2. The intermediate image formation optical system as claimed in claim 1, wherein the image formed on the light valve is magnified to form the intermediate image.

3. The intermediate image formation optical system as claimed in claim 1, wherein the pixel shift unit further includes:
    a liquid crystal layer,
    a transparent member holding the liquid crystal layer, and
    a voltage application unit that applies a voltage on the liquid crystal layer to change a direction of a liquid crystal axis to shift the light path of the light beam from the light valve.

4. The intermediate image formation optical system as claimed in claim 3, wherein at ends of the scanning lines, the liquid crystal layer of the pixel shift unit extends up to a region outside a position of the voltage application unit.

5. The intermediate image formation optical system as claimed in claim 1, wherein a light path separation unit is provided to separate a light path of illumination light to the light valve and a light path of light reflected from the light valve.

6. The intermediate image formation optical system as claimed in claim 1, wherein the intermediate image formation unit has telecentricity in an image space between the intermediate image formation unit and the pixel shift unit.

7. The intermediate image formation optical system as claimed in claim 1, wherein a linear light polarization unit is provided between the intermediate image formation unit and the pixel shift unit.

8. The intermediate image formation optical system as claimed in claim 1, wherein the plurality of pixel shift areas are independently drivable and arranged side by side in a plane perpendicular to an optical axis.

9. The intermediate image formation optical system as claimed in claim 8, wherein the plurality of pixel shift areas shift the intermediate image in a line-sequential manner in synchronization with a timing of updating the corresponding scanning line of the light valve.

10. The intermediate image formation optical system as claimed in claim 1, wherein
    a total number of the plurality of pixel shift areas is less than a number of the scanning lines.

11. The intermediate image formation optical system as claimed in claim 1, wherein
    the pixel shift unit includes a same number of the plurality of pixel shift areas as the scanning lines in a plane perpendicular to an optical axis, said plurality of pixel shift areas being integrated into a line structure.

12. An image display device, comprising:
    an intermediate image formation optical system including
        a light valve configured to update an image frame in a line-sequential manner;
        a pixel shift unit configured to shift a light path of a light beam from the light valve so as to shift a position of an image formed on the light valve; and
        an intermediate image formation unit arranged on the light path between the light valve and the pixel shift unit and configured to form an intermediate image of the image on the light valve at a position of the pixel shift unit, wherein
        the pixel shift unit includes a plurality of pixel shift areas arranged along a direction perpendicular to scanning lines of the light valve in a plane of the pixel shift unit, and
        a number of the scanning lines included in each of the pixel shift areas near a center portion of the scanning line series is greater than a number of the scanning lines included in each of the pixel shift areas in a periphery of the pixel shift unit.

13. A method of applying a voltage to an intermediate image formation optical system, said intermediate image formation optical system including a light valve configured to update an image frame in a line-sequential manner, a pixel shift unit configured to shift a light path of a light beam from the light valve to shift a position of an image formed on the light valve, and an intermediate image formation unit arranged on the light path between the light valve and the pixel shift unit and configured to form an intermediate image of the image on the light valve at a position of the pixel shift unit, the pixel shift unit including a plurality of pixel shift areas arranged along a direction perpendicular to scanning lines of the light valve in a plane of the pixel shift unit, and a number of the scanning lines included in each of the pixel shift areas near a center portion of the scanning line series being greater than a number of the scanning lines included in each of the pixel shift areas in a periphery of the pixel shift unit,
    said method comprising a step of:
        applying voltages on the plurality of pixel shift areas of the pixel shift unit, independently.

14. The method as claimed in claim 13, wherein application of the voltage on one of the plurality of pixel shift areas is performed in a period of updating the image frame on the light valve corresponding to the one of the plurality of pixel shift areas.

* * * * *